United States Patent
Wood et al.

(10) Patent No.: US 10,264,099 B2
(45) Date of Patent: Apr. 16, 2019

(54) METHOD AND SYSTEM FOR CONTENT CLOSURES IN A CONTENT CENTRIC NETWORK

(71) Applicant: CISCO TECHNOLOGY, INC., San Jose, CA (US)

(72) Inventors: Christopher A. Wood, San Francisco, CA (US); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 15/063,250

(22) Filed: Mar. 7, 2016

(65) Prior Publication Data

US 2017/0257461 A1    Sep. 7, 2017

(51) Int. Cl.
  *H04L 29/08* (2006.01)
  *H04L 29/06* (2006.01)
  *G06F 9/54* (2006.01)

(52) U.S. Cl.
  CPC ............. *H04L 67/327* (2013.01); *G06F 9/54* (2013.01); *H04L 69/22* (2013.01); *G06F 2209/509* (2013.01)

(58) Field of Classification Search
  CPC ... H04L 45/748; H04L 1/0065; H04L 45/245; H04L 63/08; G06F 17/30955; G06F 15/16
  USPC .......................... 709/202, 224, 250; 370/392
  See application file for complete search history.

(56) References Cited

U.S. PATENT DOCUMENTS

| | | | |
|---|---|---|---|
| 5,649,109 | A | 7/1997 | Griesmer |
| 6,021,464 | A | 2/2000 | Yao |
| 6,047,331 | A | 4/2000 | Medard |
| 6,128,623 | A | 10/2000 | Mattis |
| 6,128,627 | A | 10/2000 | Mattis |

(Continued)

FOREIGN PATENT DOCUMENTS

| | | |
|---|---|---|
| CN | 103873371 | 6/2014 |
| EP | 1383265 A1 | 1/2004 |

(Continued)

OTHER PUBLICATIONS

International Search Report and Written Opinion in corresponding International Application No. PCT/US2017/020836, dated May 23, 2017, 12 pages.

(Continued)

*Primary Examiner* — Tesfay Yohannes (57) ABSTRACT

One embodiment provides a system that facilitates content closures in a CCN. During operation, the system generates, by a client computing device, an initial interest with a name that is a hierarchically structured variable length identifier which comprises contiguous name components ordered from a most general level to a most specific level, wherein the initial interest indicates a request for a result of a computation. The system receives from a content producing device a content object which indicates a function that outputs the requested result and data to be used as input to the function. The system performs the function based on the indicated data, which outputs the requested result, thereby facilitating a content producing device to offload computation of the function to the client computing device.

17 Claims, 9 Drawing Sheets

(56) References Cited

U.S. PATENT DOCUMENTS

| | | |
|---|---|---|
| 6,182,133 B1 | 1/2001 | Horvitz |
| 6,209,003 B1 | 3/2001 | Mattis |
| 6,289,358 B1 | 9/2001 | Mattis |
| 6,292,880 B1 | 9/2001 | Mattis |
| 6,363,067 B1 | 3/2002 | Chung |
| 6,366,947 B1 | 4/2002 | Kavner |
| 6,775,258 B1 | 8/2004 | vanValkenburg |
| 6,834,272 B1 | 12/2004 | Naor |
| 6,915,307 B1 | 7/2005 | Mattis |
| 6,957,228 B1 | 10/2005 | Graser |
| 7,007,024 B2 | 2/2006 | Zelenka |
| 7,043,637 B2 | 5/2006 | Bolosky |
| 7,080,073 B1 | 7/2006 | Jiang |
| RE39,360 E | 10/2006 | Aziz |
| 7,149,750 B2 | 12/2006 | Chadwick |
| 7,233,948 B1 | 6/2007 | Shamoon |
| 7,426,696 B1 | 9/2008 | Hwang |
| 7,535,926 B1 | 5/2009 | Deshpande |
| 7,636,767 B2 | 12/2009 | Lev-Ran |
| 7,711,684 B2 | 5/2010 | Sundaresan |
| 7,747,749 B1 | 6/2010 | Aamodt |
| 7,801,069 B2 | 9/2010 | Cheung |
| 7,814,425 B1 | 10/2010 | O'Shaugnessy |
| 7,873,619 B1 | 1/2011 | Faibish |
| 7,979,912 B1 | 7/2011 | Roka |
| 8,069,023 B1 | 11/2011 | Frailong |
| 8,239,331 B2 | 8/2012 | Shanmugavelayutham |
| 8,271,687 B2 | 9/2012 | Turner |
| 8,332,357 B1 | 12/2012 | Chung |
| 8,375,420 B2 | 2/2013 | Farrell |
| 8,688,727 B1 | 4/2014 | Das |
| 8,861,356 B2 | 10/2014 | Kozat |
| 8,863,227 B2 | 10/2014 | Zhang |
| 9,002,921 B2 | 4/2015 | Westphal |
| 9,009,465 B2 | 4/2015 | Zhang |
| 9,032,095 B1 | 5/2015 | Traina |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 9,380,326 B1 | 6/2016 | Corley |
| 9,400,852 B2 | 7/2016 | Kim |
| 9,466,212 B1* | 10/2016 | Stumphauzer, II .... G08G 1/137 |
| 9,609,014 B2* | 3/2017 | Solis ................ H04L 45/745 |
| 2001/0051927 A1 | 12/2001 | London |
| 2002/0002680 A1 | 1/2002 | Carbajal |
| 2003/0009365 A1 | 1/2003 | Tynan |
| 2003/0046421 A1 | 3/2003 | Horvitz et al. |
| 2004/0049541 A1 | 3/2004 | Swahn |
| 2004/0196783 A1 | 10/2004 | Shinomiya |
| 2004/0218548 A1 | 11/2004 | Kennedy |
| 2004/0233916 A1 | 11/2004 | Takeuchi |
| 2004/0246902 A1 | 12/2004 | Weinstein |
| 2004/0267902 A1 | 12/2004 | Yang |
| 2005/0066121 A1 | 3/2005 | Keeler |
| 2005/0132207 A1 | 6/2005 | Mourad |
| 2006/0242155 A1 | 10/2006 | Moore |
| 2006/0248078 A1 | 11/2006 | Gross |
| 2006/0288237 A1 | 12/2006 | Goodwill |
| 2007/0156998 A1 | 7/2007 | Gorobets |
| 2008/0005223 A1 | 1/2008 | Flake |
| 2008/0082509 A1 | 4/2008 | Bessieres |
| 2008/0082662 A1 | 4/2008 | Dandliker |
| 2008/0095159 A1 | 4/2008 | Suzuki |
| 2008/0123536 A1 | 5/2008 | Johnson |
| 2008/0244460 A1 | 10/2008 | Louch |
| 2008/0291923 A1 | 11/2008 | Back |
| 2009/0132642 A1 | 5/2009 | Ortal et al. |
| 2009/0135728 A1 | 5/2009 | Shen |
| 2009/0198832 A1 | 8/2009 | Shah |
| 2009/0216910 A1* | 8/2009 | Duchesneau ......... G06F 9/5072 709/250 |
| 2009/0274158 A1 | 11/2009 | Sharp |
| 2009/0276396 A1 | 11/2009 | Gorman |
| 2009/0287853 A1 | 11/2009 | Carson |
| 2009/0288076 A1 | 11/2009 | Johnson |
| 2009/0296719 A1 | 12/2009 | Maier |
| 2009/0307286 A1 | 12/2009 | Laffin |
| 2010/0195655 A1* | 8/2010 | Jacobson ................ H04L 45/00 370/392 |
| 2010/0217985 A1 | 8/2010 | Fahrny |
| 2010/0257149 A1 | 10/2010 | Cognigni |
| 2010/0316052 A1 | 12/2010 | Petersen |
| 2010/0332595 A1 | 12/2010 | Fullagar |
| 2011/0131308 A1 | 6/2011 | Eriksson |
| 2011/0137919 A1 | 6/2011 | Ryu |
| 2011/0219093 A1 | 9/2011 | Ragunathan |
| 2011/0219727 A1 | 9/2011 | May |
| 2011/0225293 A1 | 9/2011 | Rathod |
| 2011/0280214 A1 | 11/2011 | Lee |
| 2012/0045064 A1 | 2/2012 | Rembarz |
| 2012/0079056 A1 | 3/2012 | Turanyi et al. |
| 2012/0102136 A1 | 4/2012 | Srebrny |
| 2012/0110159 A1 | 5/2012 | Richardson |
| 2012/0158912 A1 | 6/2012 | Jacobson |
| 2012/0166433 A1 | 6/2012 | Tseng |
| 2012/0166806 A1 | 6/2012 | Zhang |
| 2012/0237028 A1 | 9/2012 | Khazan |
| 2012/0300669 A1 | 11/2012 | Zahavi |
| 2012/0307629 A1 | 12/2012 | Vasseur |
| 2012/0317655 A1 | 12/2012 | Zhang |
| 2013/0016695 A1 | 1/2013 | Ravindran |
| 2013/0039249 A1 | 2/2013 | Ravindran |
| 2013/0061084 A1 | 3/2013 | Barton |
| 2013/0073882 A1 | 3/2013 | Inbaraj |
| 2013/0090942 A1 | 4/2013 | Robinson |
| 2013/0091237 A1 | 4/2013 | Ambalavanar |
| 2013/0110781 A1 | 5/2013 | Golab |
| 2013/0121489 A1 | 5/2013 | Pestoni |
| 2013/0128786 A1 | 5/2013 | Sultan |
| 2013/0139245 A1 | 5/2013 | Thomas |
| 2013/0163758 A1 | 6/2013 | Viswanathan |
| 2013/0227048 A1 | 8/2013 | Xie |
| 2013/0258878 A1 | 10/2013 | Wakikawa |
| 2013/0262698 A1 | 10/2013 | Schwan |
| 2013/0275544 A1 | 10/2013 | Westphal |
| 2013/0332955 A1 | 12/2013 | Hong |
| 2013/0332971 A1 | 12/2013 | Fisher |
| 2013/0346877 A1 | 12/2013 | Borovoy |
| 2014/0003424 A1 | 1/2014 | Matsuhira |
| 2014/0023076 A1 | 1/2014 | Calo |
| 2014/0033193 A1 | 1/2014 | Palaniappan |
| 2014/0043987 A1 | 2/2014 | Watve |
| 2014/0082661 A1 | 3/2014 | Krahnstoever |
| 2014/0090761 A1 | 4/2014 | Foucher |
| 2014/0096269 A1 | 4/2014 | Amidei |
| 2014/0098685 A1 | 4/2014 | Shattil |
| 2014/0122587 A1 | 5/2014 | Petker |
| 2014/0129690 A1 | 5/2014 | Jaisinghani |
| 2014/0181140 A1 | 6/2014 | Kim |
| 2014/0192677 A1 | 7/2014 | Chew |
| 2014/0204945 A1 | 7/2014 | Byun |
| 2014/0237085 A1 | 8/2014 | Bevilacqua-Linn et al. |
| 2014/0298248 A1 | 10/2014 | Kang |
| 2014/0304389 A1* | 10/2014 | Reavis .................... G06Q 30/02 709/224 |
| 2015/0033365 A1 | 1/2015 | Mellor |
| 2015/0036535 A1 | 2/2015 | Mosko |
| 2015/0117253 A1 | 4/2015 | Scott |
| 2015/0120663 A1 | 4/2015 | LeScouarnec |
| 2015/0169758 A1 | 6/2015 | Assom |
| 2015/0222424 A1 | 8/2015 | Mosko |
| 2015/0270957 A1 | 9/2015 | Uzun |
| 2015/0279348 A1 | 10/2015 | Cao |
| 2015/0281071 A1 | 10/2015 | Mosko |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0014027 A1 | 1/2016 | Oran |
| 2016/0019275 A1 | 1/2016 | Mosko |
| 2016/0020990 A1 | 1/2016 | Mahadevan et al. |
| 2016/0021172 A1 | 1/2016 | Mahadevan |

(56) References Cited

U.S. PATENT DOCUMENTS

| | | | |
|---|---|---|---|
| 2016/0062840 | A1 | 3/2016 | Scott |
| 2016/0094553 | A1* | 3/2016 | Azgin .................. H04L 45/7453 713/154 |
| 2016/0110466 | A1 | 4/2016 | Uzun |
| 2016/0149913 | A1 | 5/2016 | Eriksson |
| 2016/0170964 | A1* | 6/2016 | Xu ....................... G06F 17/2775 704/10 |
| 2016/0171184 | A1 | 6/2016 | Solis |
| 2016/0173604 | A1 | 6/2016 | Panigrahi |
| 2016/0350294 | A1* | 12/2016 | Nefedov ........... G06F 17/30011 |
| 2016/0364419 | A1* | 12/2016 | Stanton ................ G06F 17/3002 |
| 2017/0250798 | A1* | 8/2017 | Enga ...................... H04L 9/0625 |

FOREIGN PATENT DOCUMENTS

| | | |
|---|---|---|
| EP | 1473889 A2 | 11/2004 |
| EP | 2120419 A2 | 11/2009 |
| EP | 2299754 A1 | 3/2011 |
| EP | 2323346 | 5/2011 |
| EP | 2552083 | 1/2013 |
| EP | 2562978 | 10/2014 |
| EP | 2869537 A1 | 5/2015 |
| EP | 2214356 | 5/2016 |
| WO | 2005041527 | 5/2005 |
| WO | 2007122620 | 11/2007 |
| WO | 2011159715 | 12/2011 |
| WO | 2012077073 A1 | 6/2012 |
| WO | 2014023072 | 2/2014 |
| WO | 2014090761 | 6/2014 |
| WO | 2014102371 | 7/2014 |
| WO | 2015084327 | 6/2015 |

OTHER PUBLICATIONS

Anonymous, "Content Centric Networking—Wikipedia", https://en.wikipedia.org/w/index.php?title=Content_centric_networking&oldid=706204894, Retrieved from the Internet on Feb. 5, 2018, 4 pgs.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2*.

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.

Priya Mahadevan et al. "CCN-KRS", Proceedings of the 1st International Conference on Information-Centric Networking, Inc. '14, Sep. 24, 2014.

Flavio Roberto Santos Et al. "Funnel: Choking Polluters in BitTorrent File Sharing Communities", IEEE Transactions on Network and Service Management, IEEE vol. 8, No. 4, Dec. 1, 2011.

Liu Wai-Xi et al: "Multisource Dissemination in content-centric networking", 2013 Fourth International conference on the network of the future (NOF), IEEE, Oct. 23, 2013, pp. 1-5.

Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.

Asokan et al.: "Server-Supported Signatures", Computer Security Esorics 96, Sep. 25, 1996, pp. 131-143, Section 3.

Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.

Sun et al.: "Content-Based Route Lookup Using CAMs", Global Communications Conference, IEEE, Dec. 3, 2012 *The Whole Document*.

Gelenbe et al.: "Networks With Cognitive Packets", Modeling, Analysis and Simulation of Computer and Telecommunication Systems, 2000. IEEE, Aug. 29, 2000, pp. 3-10.

Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.

Smetters et al. "Securing Network Content" Technical Report, PARC TR-2009-1, Oct. 1 2009, Retrieved from the internet URL:http://www.parc.com/content/attachments/TR-2009-01.pdf [retrieved Nov. 1, 2016].

Marc Mosko "CCNx Label Forwarding (CCNLF)" Jul. 21, 2014.

Gallo Alcatel-Lucent Bell Labs "Content-Centric Networking Packet Header Format" Jan. 26, 2015.

Huard J-F et al. "A Programmable Transport Architecture with QOS Guarantees" IEEE Communications Magazine, vol. 36, No. 10, Oct. 1, 1998.

Microsoft Computer Dictionary, Fifth Edition, 2002, Microsoft Press, p. 23.

Mind—A Brief Introduction, John R. Searle, 2004, Oxford University Press, pp. 62-67.

J.J. Garcia-Luna-Aceves "Name-Based Content Routing in Information Centric Networks Using Distance Information", Proceedings of the 1st International Conference on Information-Centric Networking, INC '14, Sep. 24, 2014, pp. 7-16, *p. 10, left-hand column, first paragraph*.

Lan Wang et al.: "OSPFN: An OSPF Based Routing Protocol for Named Data Networking", Jul. 25, 2012, URL: http://new.named-data.net/wp-content/uploads/TROSPFN.pdf [Retreived on Jul. 25, 2012], *section 3.1; p. 4*.

* cited by examiner

CONTENT CLOSURE
CONTENT OBJECT
500

```
SignedObject 502      = ContentObject [Validation Alg] [ValidationPayload]
ValidationAlg 504     = <e.g., RSA, HMAC>
ValidationPayload 506 = <e.g., a signature>

ContentObject 510     = Name CreateTime [ExpiryTime]
                          PayloadType [Payload | ContentClosurePayload]
Name 512              = <CCN name of the ContentObject>
CreateTime 514        = <UTC time>
ExpiryTime 516        = <UTC time>
PayloadType 518       = DATA | CONTENTCLOSURE | <others>
Payload 520           = *OCTETS ContentClosurePayload 522 = [ACS] Function ListOfInputs
ACS 524               = LINK
Function 526          = FunctionEncoding | LINK
FunctionEncoding 528  = <encoded function>
ListOfInputs 530      = *(FunctionInput)
FunctionInput 532     = ContentObject | LINK LINK 540              = TargetName [TargetKeyId] [TargetHash]
TargetName 542        = <CCN name of link target>
TargetKeyId 544       = <KeyId Restriction>
TargetHash 546        = <ContentObjectHash Restriction>
```

METHOD AND SYSTEM FOR CONTENT CLOSURES IN A CONTENT CENTRIC NETWORK

RELATED APPLICATION

The subject matter of this application is related to the subject matter in the following applications:

- U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");
- U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175"); and
- U.S. patent application Ser. No. 14/231,515, entitled "AGGREGATE SIGNING OF DATA IN CONTENT CENTRIC NETWORKING," by inventors Ersin Uzun, Marc E. Mosko, Michael F. Plass, and Glenn C. Scott, filed 31 Mar. 2014 (hereinafter "U.S. patent application Ser. No. 14/231,515");

the disclosures of which are herein incorporated by reference in their entirety.

BACKGROUND

Field

This disclosure is generally related to distribution of digital content. More specifically, this disclosure is related to a method and system for facilitating random access to a piece of content in a content centric network.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

A content producer may serve as a proxy between data sources (e.g., other content producers) and content consumers. For example, a consumer may send to the producer an interest request to perform a function based on data collected by the producer. The producer may obtain the data from the data sources, perform or compute the requested function, and return the result of the function to the consumer in the form of a content object. However, the rate at which the producer is able to obtain or receive updated data from the data sources may cause the producer to re-compute the function each time it receives a request from a consumer. If the computation is expensive, the producer may become overwhelmed with requests from multiple consumers, which can result in congestion and network inefficiency.

While a CCN brings many desired features to a network, some issues remain unsolved for a producer in handling multiple consumer requests that require computationally expensive operations and that are based on data from multiple data sources.

SUMMARY

One embodiment provides a system that facilitates content closures in a CCN. During operation, the system generates, by a client computing device, an initial interest with a name that is a hierarchically structured variable length identifier which comprises contiguous name components ordered from a most general level to a most specific level, wherein the initial interest indicates a request for a result of a computation. The system receives from a content producing device a content object which indicates a function that outputs the requested result and data to be used as input to the function. The system performs the function based on the indicated data, which outputs the requested result, thereby facilitating a content producing device to offload computation of the function to the client computing device.

In some embodiments, the content object further indicates names for the data. The system obtains the indicated data based on the names for the data.

In some embodiments, the system generates interests for the data based on the data names. In response to the interests, the system receives corresponding content objects based on the data names.

In some embodiments, the data is indicated in the content object as one or more of: embedded directly in the content object; and included as a link in the content object.

In some embodiments, the function indicated in the content object is further based on an encoding of logic that allows the client computing device to decode and perform the function.

In some embodiments, the content object includes a payload that indicates the function and a link to the function, and the payload further indicates the data as a list of content objects and a link to a respective content object.

In some embodiments, the content object is a manifest which indicates a set of member content objects and their corresponding names and digests, wherein the set of member content objects comprises the data to be used as input to the function as indicated in the content object.

Another embodiment provides a system that facilitates content closures in a CCN. During operation, the system receives, by a content producing device, an initial interest with a name that is a hierarchically structured variable length identifier which comprises contiguous name components ordered from a most general level to a most specific level, wherein the initial interest indicates a request by a client computing device for a result of a computation. The system generates a content object which indicates a function that outputs the requested result and data to be used as input to the function. The system transmits the content object to the client computing device, which causes the client computing device to obtain the data indicated in the content object and perform the function based on the obtained data, thereby facilitating the content producing device to offload computation of the function to the client computing device.

In some embodiments, in response to determining that a previous content object corresponding to the initial interest is stored by the content producing device, wherein the previous content object indicates the function that outputs the requested result and the data to be used as input to the function, the system transmits the previous content object to the client computing device, which causes the client computing device to obtain the data indicated in the previous content object and perform the function indicated in the previous content object based on the obtained data.

In some embodiments, the system determines data needed to compute the requested result, wherein the data includes data names. The system indicates in the content object the determined data names as names for the data to be used as input to the function. The system identifies the function that outputs the requested result.

In some embodiments, in response to detecting changes to the data needed to compute the requested result, the system generates the content object which indicates the function that outputs the requested result and the data to be used as input to the function.

In some embodiments, the system indicates the data in the content object by one or more of: embedding the data directly in the content object; and included a link to the data in the content object. The system indicates the function in the content object based on an encoding of logic that allows the client computing device to decode and perform the function.

In some embodiments, the system includes in the content object a payload that indicates the function and a link to the function, wherein the payload further indicates the data as a list of content objects and a link to a respective content object.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of offloading computation of a function from a producer to a consumer by creating a network message that can be executed by the consumer like a function or a program to generate content. In an environment where the producer acts as a proxy between data sources and content consumers, a consumer may send to the producer an interest request to perform a function based on data collected by the producer. The producer may obtain the data from the data sources, perform or compute the requested function, and return the result of the function to the consumer in the form of a content object. However, the rate at which the producer is able to obtain or receive updated data from the data sources may cause the producer to re-compute the function each time it receives a request from a consumer. If the computation is expensive, the producer may become overwhelmed with requests from the consumers, which can result in congestion and network inefficiency.

Embodiments of the present invention address this problem by creating a system that allows the producer to offload the computation of the function to the consumer via a type of content object that mimics functional programming closures. Instead of performing the requested computation on behalf of the consumer, the producer generates a content object (e.g., a "content closure message") which indicates the function or code needed to perform the computation, and also indicates the data needed to perform the function. The content closure message can indicate the function and the data via direct embedding or linking. The content closure message allows a consumer to retrieve and use the indicated data as input to perform the computation.

In the functional programming paradigm, a "closure" is a function that refers to independent or free variables, or a function that can be stored as a variable. In CCN, a "content closure message" is a type of CCN content object that encapsulates the logic of a function $f(\cdot)$ and the variables or data used to compute the function $f(\cdot)$. The function may be encoded as a Lua function, or any other suitable representation. For example, a consumer may issue an interest for a content object (e.g., data or the result of a computation) with the name N. If the producer (or proxy) has not previously created a content closure content object to compute the data for N (e.g., has not previously computed $f(N)$, the producer can generate a content closure content object with links to the logic of $f(\cdot)$ and the data necessary as input to $f(\cdot)$. If the producer has previously created such a content closure, the producer returns that previously created content closure content object. Upon receiving the content closure content object, the consumer can obtain the indicated data, and perform the indicated function $f(\cdot)$ based on the obtained data. In this way, the producer offloads the computation of the function to the consumer, which can result in increased network efficiency.

In CCN and in examples described in this disclosure, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms are used to describe the CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175 which is herein incorporated by reference.

Exemplary Network and Exemplary Communication in a System

Figure 1A:
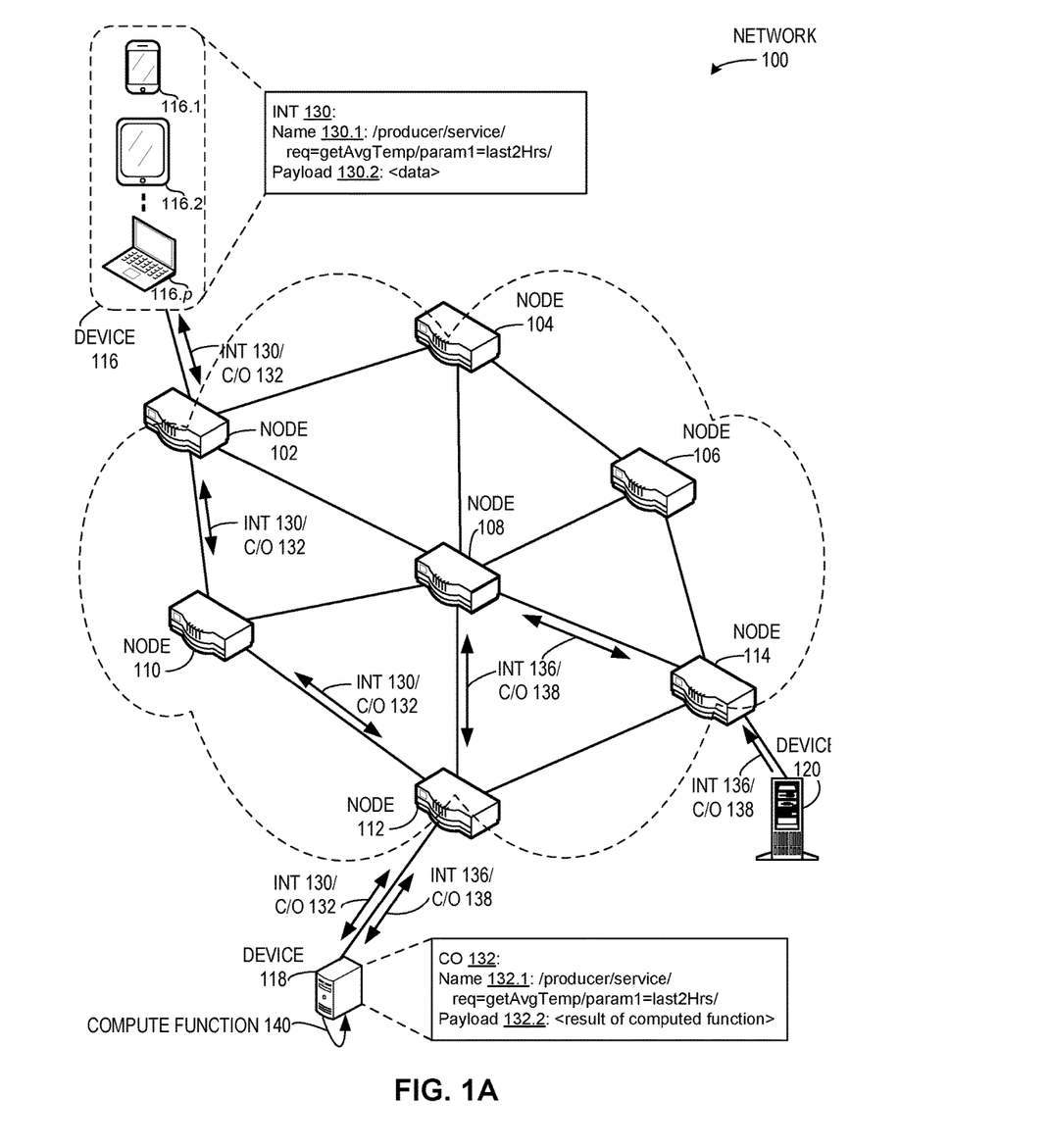
FIG. 1A illustrates an exemplary computing network in which a content producing device performs a requested computation in a content centric network.

FIG. 1A illustrates an exemplary computing network 100 in which a content producing device performs a requested computation in a content centric network. A network 100 can include a consumer or content requesting device 116, producers or content producing devices 118 and 120, and a router or other forwarding device at nodes 102, 104, 106, 108, 110, 112, and 114. Content requesting device 116 can include a smartphone 116.1, a tablet computer 116.2, and/or a personal computing device 116.p (e.g., a laptop). Content producing device 120 can be a computing device that is a source of data, such as a device that can gauge, monitor, and store temperature readings. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). Network 100 can be a content centric network.

During operation, consumer or client computing device 116 can generate an interest 130 with a name 130.1 of "/producer/service/req=getAvgTemp/param1=last2Hrs," where the terms are defined as follows: "/producer/service" is the routable prefix for content producing device 118 which serves as a proxy or service between data sources and content consumers; "req=getAvgTemp" indicates a request to obtain the average temperature; and "param1=last2Hrs" indicates that the request is for the average temperature for the last 2 hours. Interest 130 can also include an optional payload 130.2 with a value of "<data>." Interest 130 can travel through network 100 via nodes 102, 110, and 112, before reaching producer or content producing device 118. Device 118 can receive interest 130 and determine that in order to satisfy interest 130, device 118 must perform a compute function 140. Function 140 may depend upon data received from a source or source device 120. Such data can be received via a push message (e.g., in a payload of an interest 136 generated by device 120) or via a content object 138 (e.g., in response to an interest 136 generated by device 118). For example, source device 120 can be a temperature sensor which collects and stores readings for the temperature in a lab with equipment that requires a certain temperature at varying intervals. Device 118 can subsequently return a content object 132 with a name 132.1 of "/producer/service/req=getAvgTemp/param1=last2Hrs" and a payload 132.2 which includes the result of computed function 140.

Multiple consumers may submit requests similar to interest 130, and function 140 may depend upon data similar to content object 130 received from multiple sources. In this case, depending on the rate at which producer 118 receives data from each source, each interest received from a consumer may force producer 118 to re-compute function 140 in order to return the data response. If the computation is complex or expensive, producer 118 may become overwhelmed with requests, creating a bottleneck or other inefficiencies in the network.

Figure 1B:
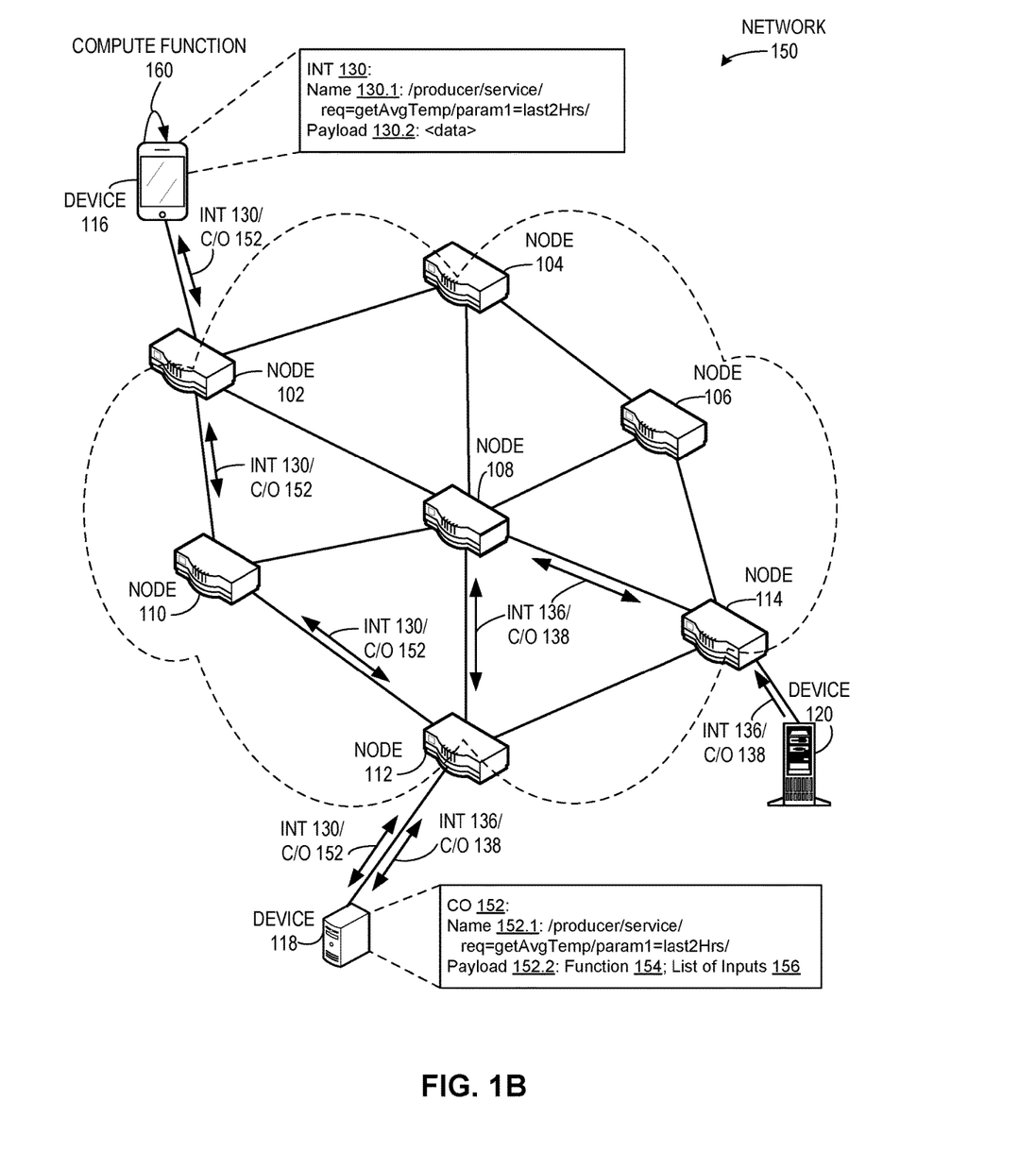
FIG. 1B illustrates an exemplary computing network that facilitates content closures in a content centric network, in accordance with an embodiment of the present invention.

Embodiments of the present invention solve this problem by allowing the producer to offload the computation to the consumer by returning a content object which indicates a function that outputs the requested result and also indicates the data to be used as input to the function. FIG. 1B illustrates an exemplary computing environment 150 that facilitates content closures in a content centric network, in accordance with an embodiment of the present invention. During operation, in response to receiving interest 130 from consumer 116, producer 118 generates a content object 152 which indicates a function 154 and a list of inputs 156. Function 154 can be indicated as a link to logic which allows a user to perform a function similar to function 140 of FIG. 1A. The list of inputs 156 can include links to the data required as input to function 154. Alternatively, the list of inputs 156 can include the required data embedded into content object 152. Producer 118 can transmit content object 152, which travels on a reverse path to consumer 116, e.g., via nodes 112, 110, and 102.

Upon receiving content object 152, consumer 116 can determine or retrieve the data indicated in the list of inputs 156 (not shown) and subsequently perform a compute function 160 based on the indicated function 154 and the retrieved data inputs. In this manner, the system can offload a complex computation from the producer to the consumer, thereby increasing efficiency and facilitating content closures in a content centric network.

Exemplary Communication in a System for Facilitating Content Closures in a CCN

Figure 2A:
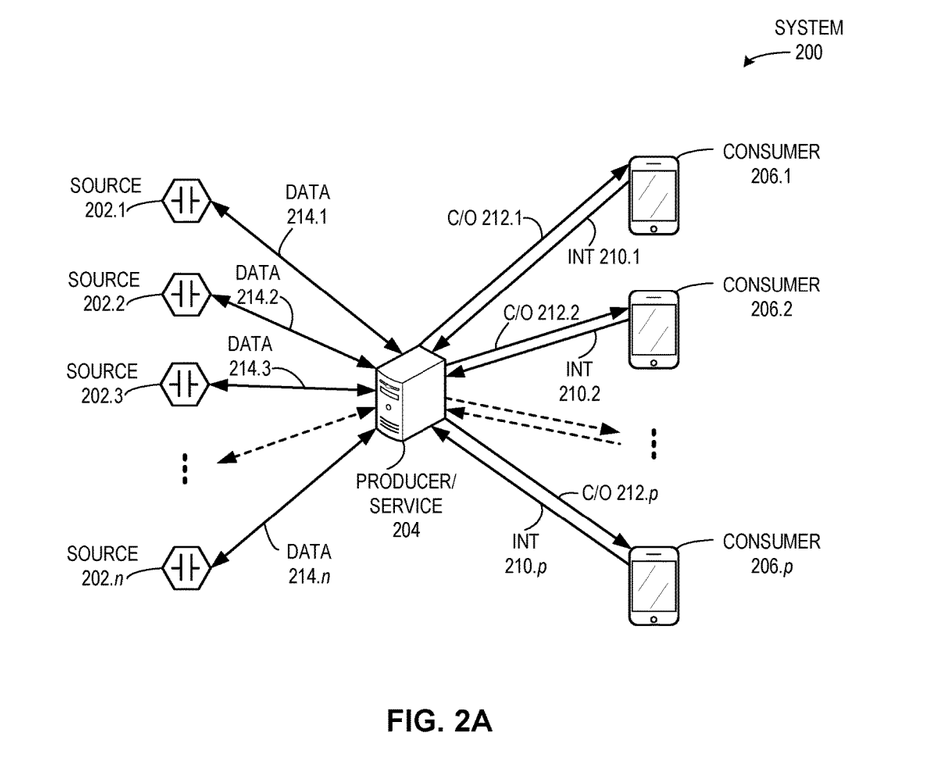
FIG. 2A illustrates an exemplary system in which a content producing device performs a requested computation in a content centric network.

FIG. 2A illustrates an exemplary system 200 in which a content producing device performs a requested computation in a content centric network. System 200 can include source devices 202.1-202.n, consumers 206.1-206.p, and a producer or service 204 which can act as a proxy or service between sources 202 and consumers 206. Sources 202 can be, for example, temperature sensors which collect and store temperature-related information based on a certain time interval, such as every 15 minutes. Sources 202 can be configured to push data 214.1-214.n to service 204 at a given time interval. Sources 202 can also be configured to transmit data 214 to service 204 in response to an interest or request from service 204 for data 214. Consumers 206 can send interests 210.1-210.p to service 204. Interests 210 may include a request for a result of a computation by service 204, and service 204 may receive data 214 from sources 202 at a decreased rate due to traffic or network congestion. This may result in a bottleneck at service 204 as it waits to perform the necessary computation to return responsive content objects 212.1-212.P back to consumers 206.

Figure 2B:
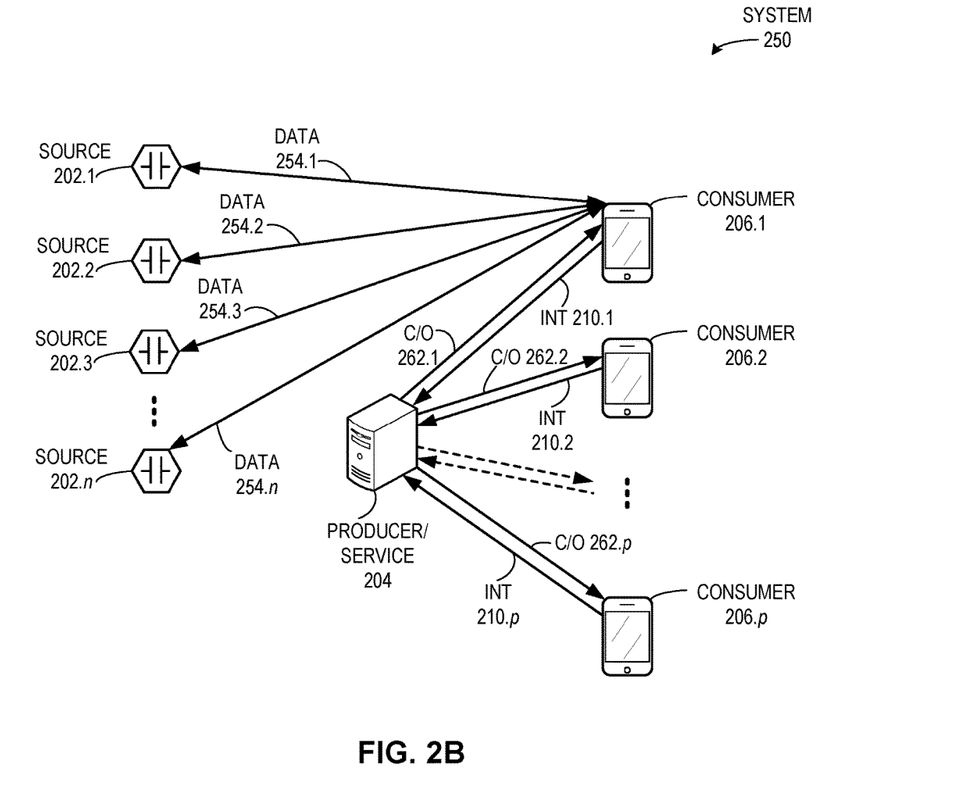
FIG. 2B illustrates an exemplary system that facilitates content closures in a content centric network, in accordance with an embodiment of the present invention.

FIG. 2B illustrates an exemplary system 250 that facilitates content closures in a content centric network, in accordance with an embodiment of the present invention. In system 250, service 204 receives interests 210.1-210.p from consumers 206.1-206.p. In response to interests 210, service 204 can generate content objects 262.1-262.p. Content objects 262 include a link to a function which is a computation that will return the requested result. Content objects 262 also indicate data 254 to use as input to perform the function that will return the requested result. Consumers 206.1-206.p can retrieve data 254.1-254.n from source devices 202.1-202.n (e.g., via interest and content object exchanges). In this manner (and as depicted in relation to FIG. 1B), system 250 offloads the computation of the function from service 204 to consumers 206, which creates a more efficient network.

Note that while consumers 206 are depicted as client computing devices and service 204 is depicted as a producer or proxy (e.g., a content producing device) in FIG. 2B, the roles of these entities may be reversed such that the producer acts as the consumer, and the consumer acts as the proxy. In other words, the same computing device can serve as both a requesting consumer in one communication and as a proxy or producer in another communication.

Role of Client Computing Device in Facilitating Content Closures in a CCN

Figure 3:
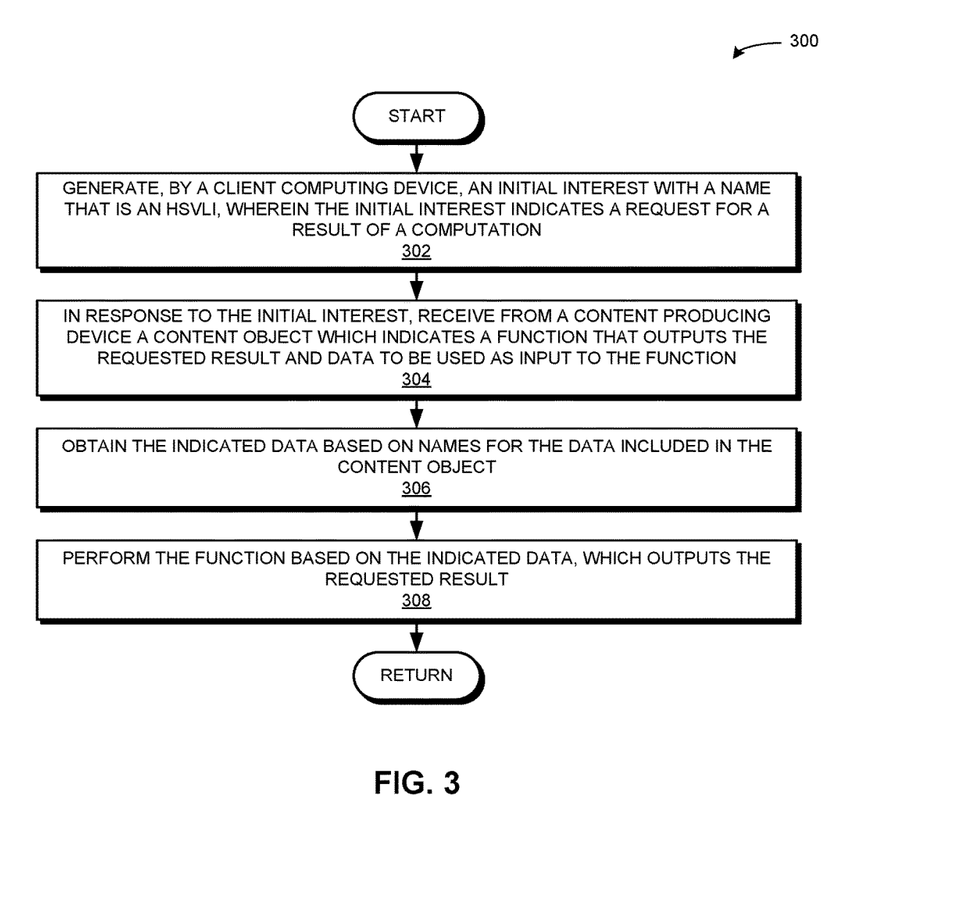
FIG. 3 presents a flow chart illustrating a method performed by a client computing device or a content consumer for retrieving content in a system which facilitates content closures, in accordance with an embodiment of the present invention.

FIG. 3 presents a flow chart 300 illustrating a method performed by a client computing device or a content consumer for retrieving content in a system which facilitates content closures, in accordance with an embodiment of the present invention. During operation, a client computing device generates an initial interest with a name that is an HSVLI which comprises contiguous name components ordered from a most general level to a most specific level, where the initial interest indicates a request for a result of a computation (operation 302). In response to the initial interest, the client computing device receives from a content producing device a content object which indicates a function that outputs the requested result and data to be used as input to the function (operation 304). The content object can include links to the function and the data, or can include the function and the data directly embedded in the content object. The function itself can be based on an encoding of logic that allows the client computing device to decode and perform the function. Furthermore, the content object can itself be a CCN manifest, as described in U.S. patent application Ser. No. 14/231,515.

The client computing device obtains the indicated data based on names for the data included in the content object (operation 306). For example, the client computing device can generate interests for the data based on the data names, and, in response to the interests, receive corresponding content objects. The client computing device performs the indicated function based on the indicated data, and the function outputs the requested result (operation 308).

Role of Content Producing Device in Facilitating Content Closures in a CCN

Figure 4:
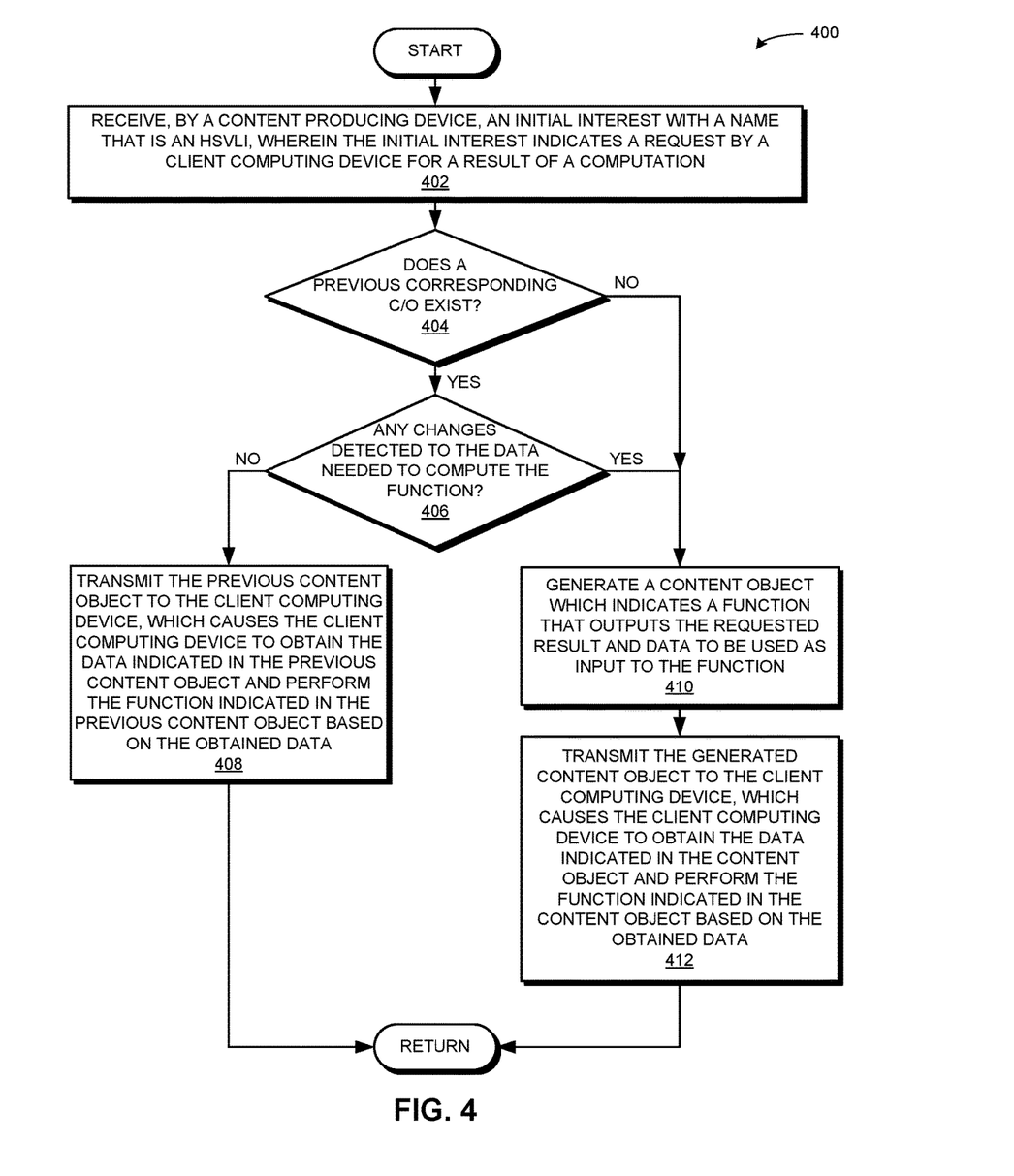
FIG. 4 presents a flow chart illustrating a method performed by a content producing device or a producer for generating content in a system which facilitates content closures, in accordance with an embodiment of the present invention.

FIG. 4 presents a flow chart 400 illustrating a method performed by a content producing device or a producer for generating content in a system which facilitates content closures, in accordance with an embodiment of the present invention. During operation, a content producing device receives an initial interest with a name that is an HSVLI which comprises contiguous name components ordered from a most general level to a most specific level, where the initial interest indicates a request for a result of a computation (operation 402). The content producing device determines whether a previous corresponding content object exists (decision 404), e.g., in a local cache or a content store of the content producing device. If it does not, the content producing device generates a content object which indicates a function that outputs the requested result and data to be used as input to the function (operation 410). Subsequently, the content producing device transmits the generated content object to the client computing device, which causes the client computing device to obtain the data indicated in the content object and perform the function indicated in the content object based on the obtained data (operation 412).

If a previous corresponding content object does exist (decision 404), the content producing device determines whether it detects any changes to the data needed to compute the function (decision 406). If it does detect changes, the operation continues as described above for operations 410 and 412. If it does not detect any changes to the data needed to compute the function (decision 406), the content producing device transmits the previous content object to the client computing device, which causes the client computing device to obtain the data indicated in the previous content object and perform the function indicated in the previous content object based on the obtained data (operation 408).

Exemplary Format of Content Closure Content Objects

Figure 5:
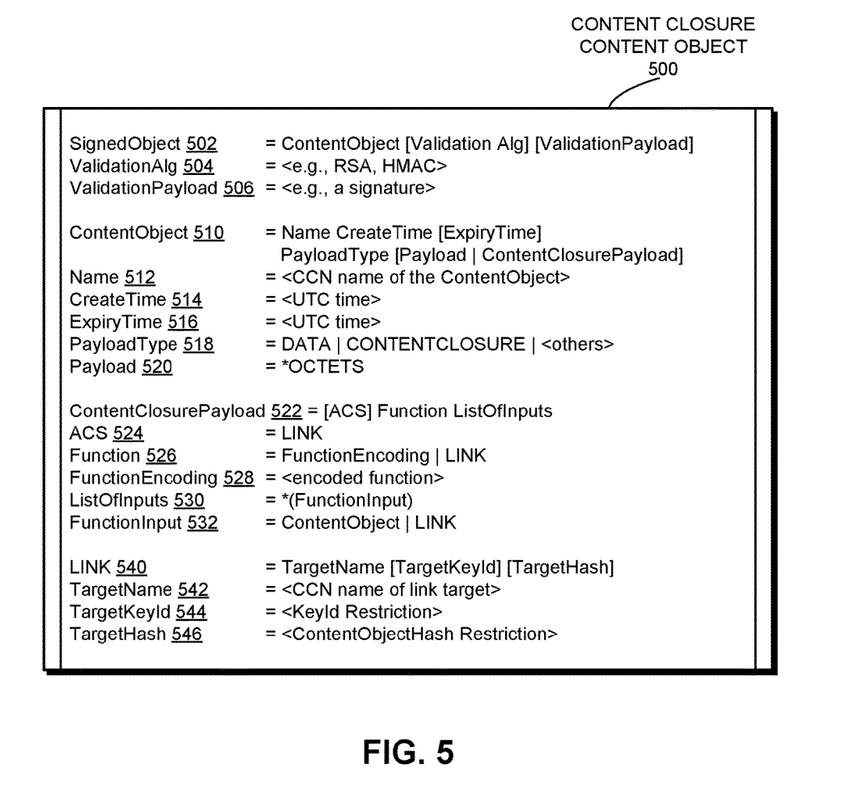
FIG. 5 presents a table depicting a format of a CCN content closure content object, in accordance with an embodiment of the present invention.

FIG. 5 presents a table depicting a format of a CCN content closure content object 500, in accordance with an embodiment of the present invention. The format of content object 500 is based on the metalanguage of Augmented Backus-Naur Form (ABNF). Content object 500 can contain a signed object 502 field that indicates the content object and can also include a validation algorithm and a validation payload. A validation algorithm 504 field can contain, e.g., an RSA or an HMAC. A validation payload 506 field can contain, e.g., a signature of the producer of the content object. Validation algorithm 504 and validation payload 506 are optional fields designed for integrity checks or authentication, and do not affect the contents of the content object. A content object 510 field indicates a name, create time, expiry time, and payload type of the content object. A name 512 field indicates the CCN name of the content object. A create time 514 field and an expiry time 516 field indicate the respective create and expiration times in, e.g., a UTC time. A payload type 518 field indicates whether the payload type is data, content closure, or other (e.g., a manifest). A payload 520 field can be a list of content objects. If payload type 518 indicates a content closure, the payload of content object 500 will be parsed as a content closure payload 522.

Content closure payload 522 can include an optional access control specification ("ACS"), a function, and a list of inputs. An ACS 524 field contains a link to a list which specifies policies, permissions, and other control related features for accessing the function and the list of inputs. Function 526 includes a directly embedded function encoding or a link to the function encoding. Function encoding 528 indicates the logic for the encoded function. List of inputs 530 contains a list of data items that are function inputs. Function input 532 includes a directly embedded content object that is the input or a link to the data or content object that is the input. A link 540 includes a target name 542 field that is the CCN name of the link target, a target KeyId 544 field that is the KeyId restriction for the link target, and a target hash 546 field which contains a content object hash restriction for the link target.

Figure 6:
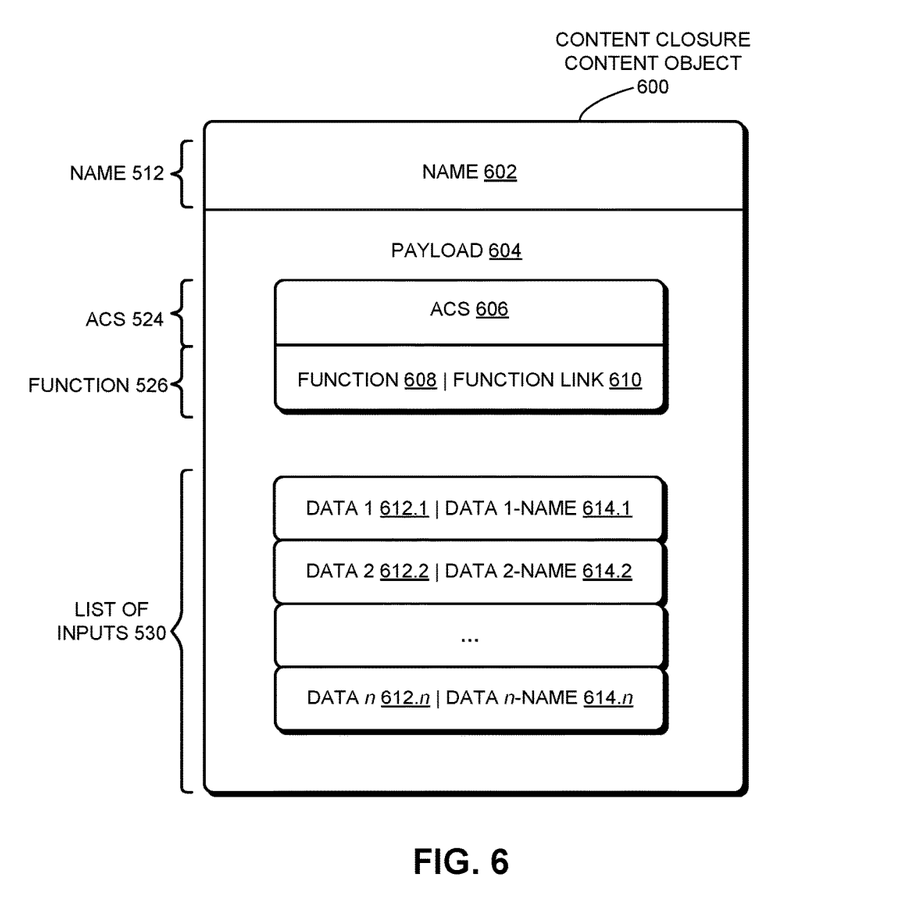
FIG. 6 presents an exemplary CCN content closure content object, in accordance with an embodiment of the present invention.

FIG. 6 presents an exemplary CCN content closure content object 600, in accordance with an embodiment of the present invention. Content object 600 can include a name 602 and a payload 604. Name 602 can correspond to name 512 of FIG. 5, and payload 604 can correspond to content closure payload 522 of FIG. 5. Payload 604 can include an ACS 606 and a function 608 or a function link 610. ACS 606 can correspond to ACS 524 of FIG. 5, and function 608/function link 610 can correspond to function 526 of FIG. 5. Function 608 can be a directly embedded function encoding (such as function encoding 528 of FIG. 5) or a link to the function. Content object 600 can also include one or more data items 612.1-612.n, either embedded directly into content object 600 (e.g., data 1 612.1) or indicated as a link in content object 600 (e.g., data 1-name 614.1). Data items 612.1-612.n can correspond to the list of inputs 530 of FIG. 5.

Exemplary Computer and Communication System

Figure 7:
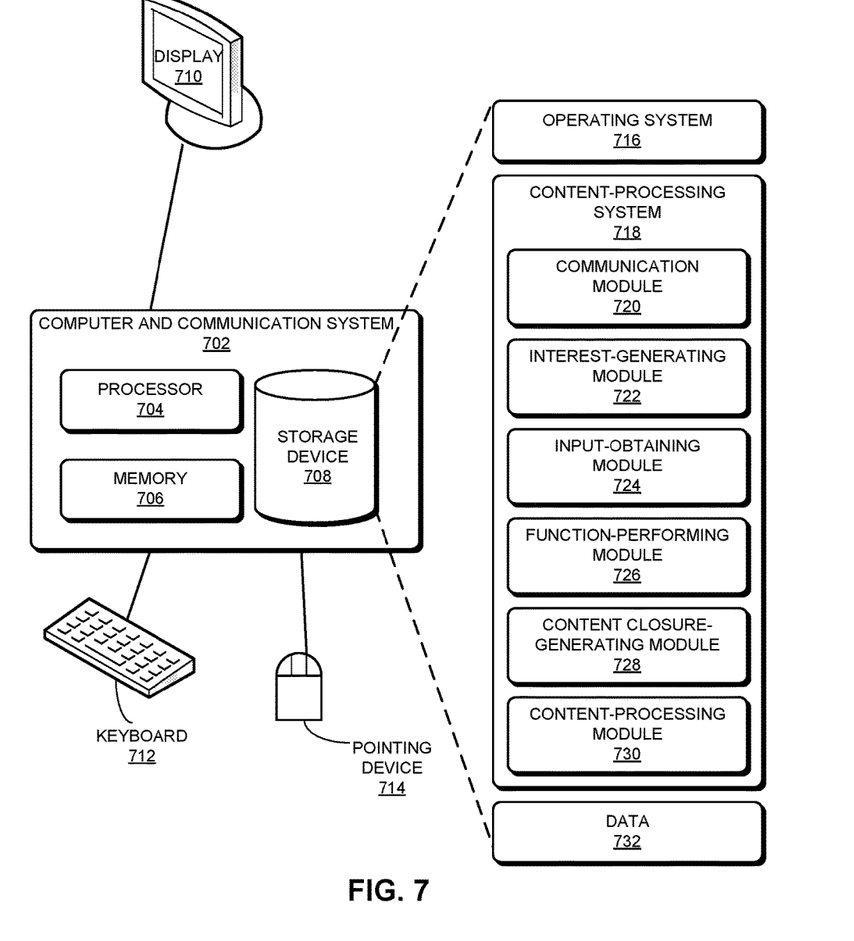
FIG. 7 illustrates an exemplary computer and communication system that facilitates content closures in a content centric network, in accordance with an embodiment of the present invention.

FIG. 7 illustrates an exemplary computer and communication system 702 that facilitates content closures in a content centric network, in accordance with an embodiment of the present invention. Computer and communication system 702 includes a processor 704, a memory 706, and a storage device 708. Memory 706 can include a volatile memory (e.g., RAM) that serves as a managed memory, and can be used to store one or more memory pools. Furthermore, computer and communication system 702 can be coupled to a display device 710, a keyboard 712, and a pointing device 714. Storage device 708 can store an operating system 716, a content-processing system 718, and data 732.

HERE HERE HERE Content-processing system 718 can include instructions, which when executed by computer and communication system 702, can cause computer and communication system 702 to perform methods and/or processes described in this disclosure. Specifically, content-processing system 718 may include instructions for sending and/or receiving data packets to/from other network nodes across a computer network, such as a content centric network (communication module 720). A data packet can include an interest packet or a content object packet with a name which is an HSVLI that includes contiguous name components ordered from a most general level to a most specific level.

Specifically, content-processing system 718 may include instructions for generating an initial interest that indicates a request for a result of a computation (interest-generating module 722). Content-processing system 718 may include instructions for receiving from a content producing device a content object which indicates a function that outputs the requested result and data to be used as input to the function (communication module 720). Content-processing system 718 may also include instructions for performing the function based on the indicated data, which outputs the requested result (function-performing module 726). Content-processing system 718 may include instructions for obtaining the indicated data based on names for the data indicated in the content object (input-obtaining module 724). Content-processing system 718 may also include instructions for generating interests for the data based on the data names (interest-generating module 722), and, in response to the interests, receiving corresponding content objects based on the data names (communication module 720).

Content-processing system 718 may further include instructions for receiving an initial interest that indicates a request by a client computing device for a result of a computation (communication module 720). Content-processing system 718 may include instructions for generating a content object which indicates a function that outputs the requested result and data to be used as input to the function (content closure-generating module 728), and for transmitting the content object to the client computing device (communication module 720).

Content-processing system 718 may further include instructions for, in response to determining that a previous content object corresponding to the initial interest is stored by the content producing device (content-processing module 730), transmitting the previous content object to the client computing device (communication module 720). Content-processing system 718 may include instructions for: determining data needed to compute the requested result, wherein the data includes data names; indicating in the content object the determined data names as names for the data to be used as input to the function; and identifying the function that outputs the requested result (content closure-generating module 728). Content-processing system 718 may also include instructions for, in response to detecting changes to the data needed to compute the requested result (content-processing module 730), generating the content object which indicates the function that outputs the requested result and the data to be used as input to the function (content closure-generating module 728).

Content-processing system 718 may also include instructions for indicating the data in the content object by one or more of: embedding the data directly in the content object; and included a link to the data in the content object (content closure-generating module 728). Content-processing system 718 can include instructions for indicating the function in the content object based on an encoding of logic that allows the client computing device to decode and perform the function (content closure-generating module 728). Content-processing system 718 may also include instructions for including in the content object a payload that indicates the function and a link to the function, wherein the payload further indicates the data as a list of content objects and a link to a respective content object (content closure-generating module 728).

Data 732 can include any data that is required as input or that is generated as output by the methods and/or processes described in this disclosure. Specifically, data 732 can store at least: an interest; a name for an interest that is an HSVLI which comprises contiguous name components ordered from a most general level to a most specific level; an interest that indicates a request for a result of a computation; the result of the computation; a content object; a function or encoding for a function; a link to the function; data to be used as input to the function; a link to the data to be used as input to the function; a content closure content object that indicates the function and the data to be used as input to the function; names for the data; a manifest that indicates the function and the data to be used as input to the function; a previously stored content closure content object; and a payload that indicates the function and the data to be used as input to the function.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating content closures, the system comprising:
    a processor; and
    a storage device coupled to the processor and storing instructions that when executed by a computer cause the computer to perform a method, the method comprising:
        receiving, by a content producing device from a content centric network (CCN), an initial interest with a name used by the CCN to forward the initial interest to the content producing device, wherein the initial interest indicates a request by a client computing device for a result of a computation;
        determining whether a previous content object corresponding to the initial interest is stored by the content producing device, wherein the previous content object indicates a function that outputs the requested result and data to be used as input to the function;
        if the previous content object corresponding to the initial interest is stored, determining whether any changes to the data are needed to compute the function;
        if the previous content object is stored and changes to the data are needed, generating a content object which satisfies the initial interest and indicates the name by which the content object is to be forwarded by the CCN to the client computing device, wherein the content object further indicates a function that outputs the requested result, and wherein the generating includes determining data, including data names, needed to compute the requested result, indicating in the content object the determined data names as names for the data to be used as input to the function, and identifying the function that outputs the requested result; and
        transmitting the content object to the client computing device over the CCN, which causes the client computing device to obtain the data indicated in the content object and perform the function based on the obtained data, thereby facilitating the content producing device to offload computation of the function to the client computing device.

2. The computer system of claim 1, wherein the method further comprises:
    if the previous content object is stored and changes to the data are not needed, transmitting the previous content object to the client computing device, which causes the client computing device to obtain the data indicated in the previous content object and perform the function indicated in the previous content object based on the obtained data.

3. The computer system of claim 1, wherein the method further comprises:
    if the previous content object is not stored, generating the content object which satisfies the initial interest and indicates the name by which the content object is to be forwarded by the CCN to the client computing device.

4. The computer system of claim 1, wherein the method further comprises:
    indicating the data in the content object by one or more of:
        embedding the data directly in the content object; and
        included a link to the data in the content object; and
        indicating the function in the content object based on an encoding of logic that allows the client computing device to decode and perform the function.

5. The computer system of claim 1, wherein the method further comprises:
    including in the content object a payload that indicates the function and a link to the function, wherein the payload further indicates the data as a list of content objects and a link to a respective content object.

6. The computer system of claim 1, wherein the content object that is generated further includes a signature, a validation payload, a create time, and a time expiry.

7. A computer-implemented method of facilitating content closures, the method comprising:
    at a content producing device:
        receiving from a content centric network (CCN), an initial interest with a name used by the CCN to forward the initial interest to the content producing device, wherein the initial interest indicates a request by a client computing device for a result of a computation;
        determining whether a previous content object corresponding to the initial interest is stored by the content producing device, wherein the previous content object indicates a function that outputs the requested result and data to be used as input to the function;
if the previous content object corresponding to the initial interest is stored, determining whether any changes to the data are needed to compute the function;
if the previous content object is stored and changes to the data are needed, generating a content object which satisfies the initial interest and indicates the name by which the content object is to be forwarded by the CCN to the client computing device, wherein the content object further indicates a function that outputs the requested result, and wherein the generating includes determining data, including data names, needed to compute the requested result, indicating in the content object the determined data names as names for the data to be used as input to the function, and identifying the function that outputs the requested result; and
transmitting the content object to the client computing device over the CCN, which causes the client computing device to obtain the data indicated in the content object and perform the function based on the obtained data, thereby facilitating the content producing device to offload computation of the function to the client computing device.

8. The method of claim 7, further comprising:
if the previous content object is stored and changes to the data are not needed, transmitting the previous content object to the client computing device, which causes the client computing device to obtain the data indicated in the previous content object and perform the function indicated in the previous content object based on the obtained data.

9. The method of claim 7, further comprising:
if the previous content object is not stored, generating the content object which satisfies the initial interest and indicates the name by which the content object is to be forwarded by the CCN to the client computing device.

10. The method of claim 7, further comprising:
indicating the data in the content object by one or more of:
embedding the data directly in the content object; and
included a link to the data in the content object; and
indicating the function in the content object based on an encoding of logic that allows the client computing device to decode and perform the function.

11. The method of claim 7, further comprising:
including in the content object a payload that indicates the function and a link to the function, wherein the payload further indicates the data as a list of content objects and a link to a respective content object.

12. The method of claim 7, wherein the content object that is generated further includes a signature, a validation payload, a create time, and a time expiry.

13. A non-transitory computer readable storage medium storing instructions that, when executed by the processor, cause the processor to perform a method, the method comprising:
at a content producing device:
receiving from a content centric network (CCN), an initial interest with a name used by the CCN to forward the initial interest to the content producing device, wherein the initial interest indicates a request by a client computing device for a result of a computation;
determining whether a previous content object corresponding to the initial interest is stored by the content producing device, wherein the previous content object indicates a function that outputs the requested result and data to be used as input to the function;
if the previous content object corresponding to the initial interest is stored, determining whether any changes to the data are needed to compute the function;
if the previous content object is stored and changes to the data are needed, generating a content object which satisfies the initial interest and indicates the name by which the content object is to be forwarded by the CCN to the client computing device, wherein the content object further indicates a function that outputs the requested result, and wherein the generating includes determining data, including data names, needed to compute the requested result, indicating in the content object the determined data names as names for the data to be used as input to the function, and identifying the function that outputs the requested result; and
transmitting the content object to the client computing device over the CCN, which causes the client computing device to obtain the data indicated in the content object and perform the function based on the obtained data, thereby facilitating the content producing device to offload computation of the function to the client computing device.

14. The non-transitory computer readable storage medium of claim 13, wherein the method further comprises:
if the previous content object is stored and changes to the data are not needed, transmitting the previous content object to the client computing device, which causes the client computing device to obtain the data indicated in the previous content object and perform the function indicated in the previous content object based on the obtained data.

15. The non-transitory computer readable storage medium of claim 13, wherein the method further comprises:
if the previous content object is not stored, generating the content object which satisfies the initial interest and indicates the name by which the content object is to be forwarded by the CCN to the client computing device.

16. The non-transitory computer readable storage medium of claim 13, wherein the method further comprises:
indicating the data in the content object by one or more of:
embedding the data directly in the content object;
included a link to the data in the content object; and
indicating the function in the content object based on an encoding of logic that allows the client computing device to decode and perform the function.

17. The non-transitory computer readable storage medium of claim 13, wherein the method further comprises:
including in the content object a payload that indicates the function and a link to the function, wherein the payload further indicates the data as a list of content objects and a link to a respective content object.

* * * * *